May 7, 1946.                  C. ANDERSON                    2,399,903
                      ELECTRICAL MEASURING APPARATUS
                         Filed April 22, 1944        3 Sheets-Sheet 1
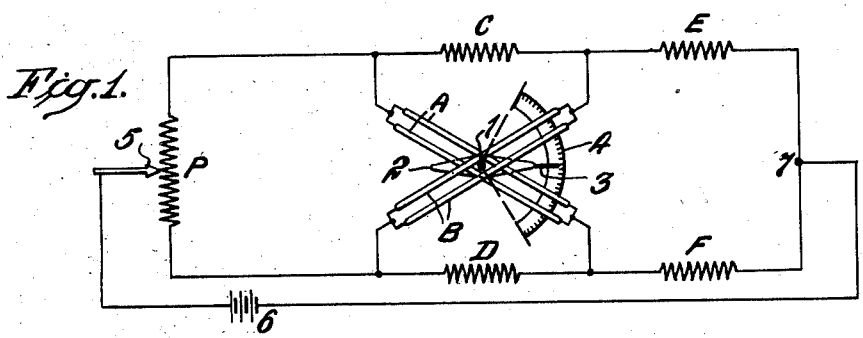
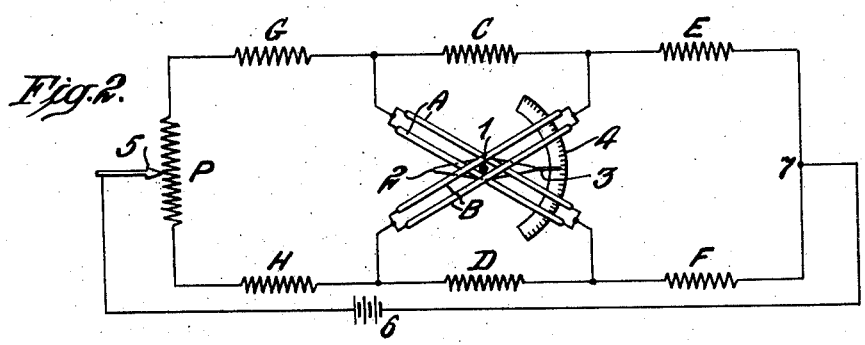
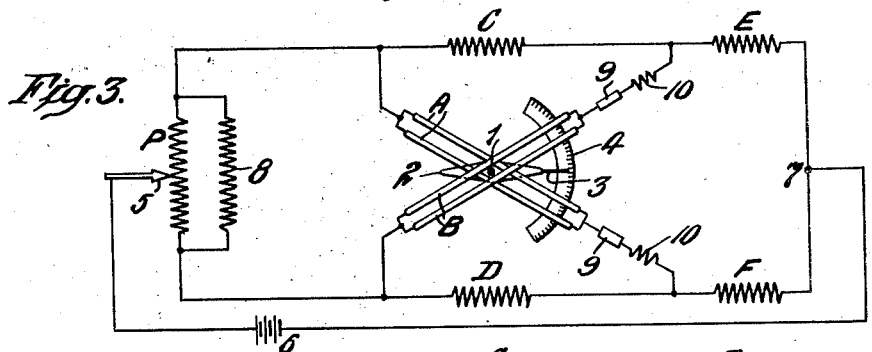
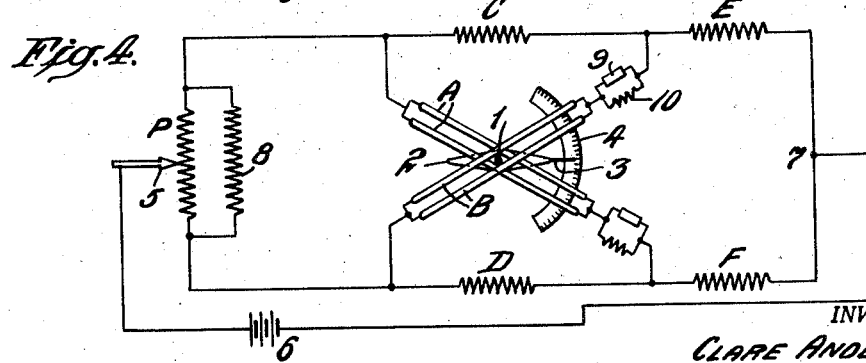
INVENTOR.
CLARE ANDERSON
BY
Lawrence K. Sager
his ATTORNEY May 7, 1946.  C. ANDERSON  2,399,903
ELECTRICAL MEASURING APPARATUS
Filed April 22, 1944    3 Sheets-Sheet 2

INVENTOR.
CLARE ANDERSON
BY
Lawrence K. Sager
his ATTORNEY

May 7, 1946.　　　C. ANDERSON　　　2,399,903
ELECTRICAL MEASURING APPARATUS
Filed April 22, 1944　　　3 Sheets-Sheet 3

INVENTOR.
CLARE ANDERSON
BY
Lawrence K. Sager
his ATTORNEY

Patented May 7, 1946

2,399,903

UNITED STATES PATENT OFFICE 2,399,903

ELECTRICAL MEASURING APPARATUS

Clare Anderson, Scotch Plains, N. J., assignor to Realty and Industrial Corporation, a corporation of New Jersey Application April 22, 1944, Serial No. 532,221

18 Claims. (Cl. 171—95)

This invention relates to electrical measuring apparatus particularly applicable to ratio measuring instruments; and to improved bridge connections and associated parts.

The apparatus may be used to measure values, or indicate change of values of a variable factor of any character such as of pressure, liquid levels, magneto-motive forces, current or voltage and the like. Such values, in the most general use of the present invention, may be reflected in the movement of a contact which is adjustable over a variable impedance or resistance device; and the ratio instrument will then indicate the position and change of position of such a contact. The measuring apparatus may be located remote from the source or location of the variable factor to be measured or indicated.

One object of the present invention is to provide an improved bridge connection and relationship of parts which will be essentially independent of change of voltage applied to the bridge circuit and thereby minimize any effect of such change of voltage on the instrument indication. Another object is to control the range of movement of the indicating pointer of the ratio meter and thereby expand or contract the range of scale readings. A further object is to provide means for increasing the sensitivity of response of the instrument and for adjustment of such sensitivity. Another object is to provide apparatus which is generally applicable to various purposes and which is readily adaptable to various conditions. Further objects are to provide apparatus which will occupy small space in compact form, utilize materials which are of low cost and easily obtainable and be durable and dependable under long continued use. Other objects and advantages will be understood from the following description and accompanying drawings which disclose embodiments of the various features of improvement.

Figure 5:
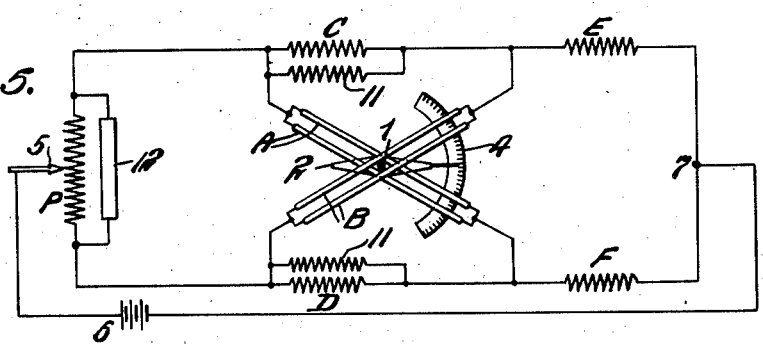
Figure 6:
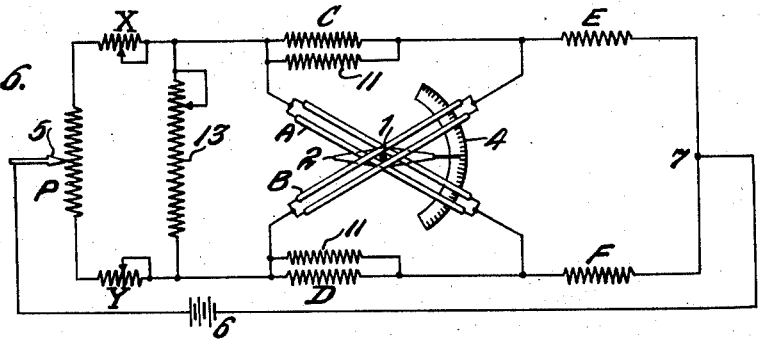
Figure 7:
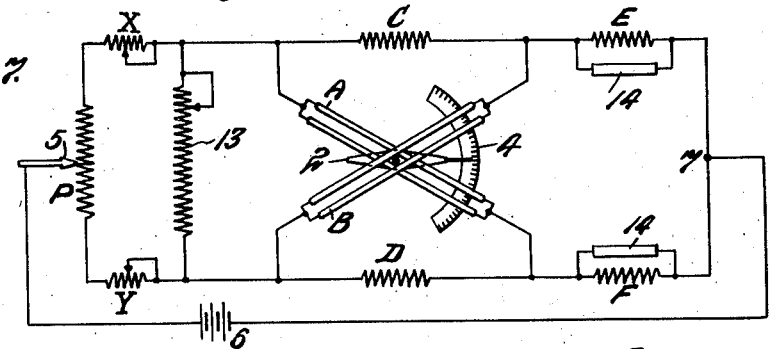
Figure 8:
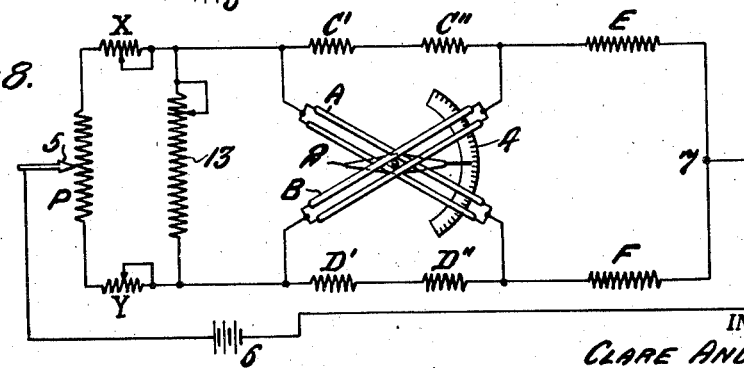
Figure 9:
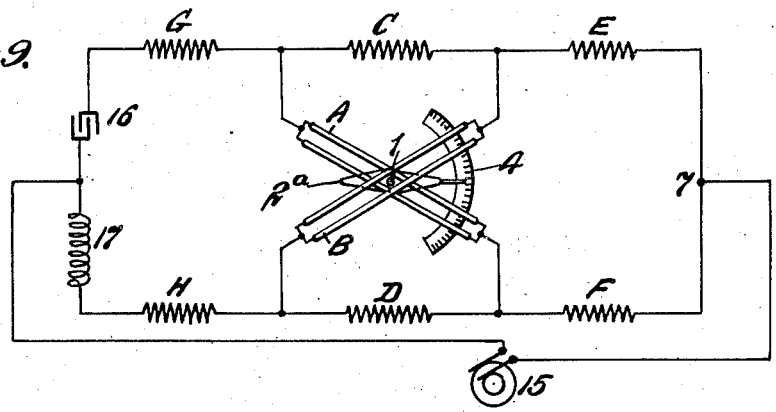
Figure 10:
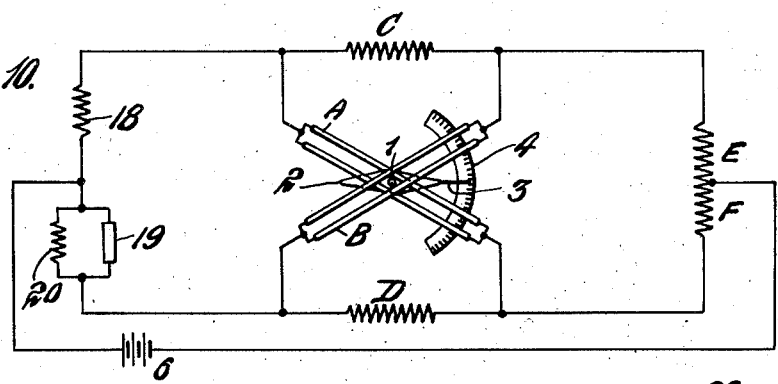
Figure 11:
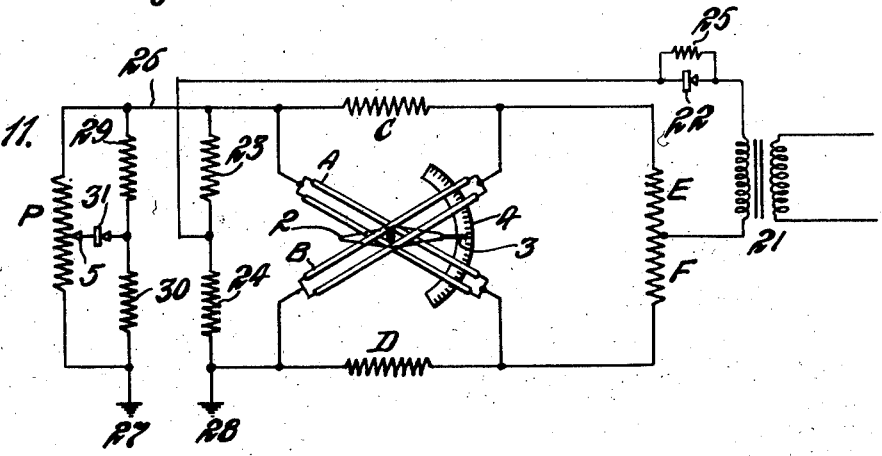

Fig. 1 is a diagram of parts and connections showing one form of bridge and instrument connections; Fig. 2 is a similar diagram with additional means to vary the sensitivity of response; Fig. 3 is a similar diagram with the provision of means for compensating for temperature changes; Fig. 4 is a diagram similar to Fig. 3 with the temperature compensators in parallel connection; Fig. 5 is a diagram similar to Fig. 1 showing another way of compensating for changes in temperature; Fig. 6 is a diagram showing means for calibration of a sending unit to a receiving apparatus and instrument having a standard calibration and to obtain a predetermined instrument sensitivity; Figs. 7 and 8 are diagrams of modifications; Fig. 9 is a diagram of the bridge connection to the instrument for use as a frequency meter; Fig. 10 is a diagram showing use as a temperature indicating apparatus; and Fig. 11 is a diagram wherein a single transmission unit is used from the controlling source to the receiver and wherein the energy is derived from an alternating current source.

Referring to Fig. 1, a ratio indicating instrument is represented having a pair of fixed coils A and a pair of fixed coils B at an angle to the coils A. Coils A and B have the same number of turns and are as nearly as possible identical in geometric shape, the planes of the coils being shown perpendicular to that of the drawings. At the central space between the coils where they cross is pivotally mounted a staff 1 supporting a permanent magnet 2. This carries a pointer 3 which is movable over a fixed graduated scale 4. The two coils A may be considered a single coil and likewise the two coils B, their division being for the purpose of providing a space for the pivotal mounting of the permanent magnet 2 within the coils. The permanent magnet will occupy an indicating position determined by the ratio of the current in the windings A and B provided the magnet is shielded from the influence of external magnetic fields.

If the current in the two windings A and B are equal, the permanent magnet 2 will occupy a mid-position as indicated in Fig. 1. If there be no current in the winding B and the current in winding A be at a maximum value, or at any value, the magnet 2 will occupy a position coinciding with the axis of the winding A and if there be no current in the winding A and a current exists in the winding B, the magnet will occupy a position coinciding with the axis of the winding B. However in the use of ratio instruments the range of deflection of the permanent magnet and indicating needle is limited in certain types of circuits because the current in either one of the two windings A or B cannot be reduced to zero value or to a close approach thereto.

By the present invention, in circuits such as shown in Fig. 1, the relationship of the parts and their connections and the impedance values may be made such that the current in the two windings A and B may be reduced to zero or reversed and thereby enable the permanent magnet to take a position coinciding with or overrunning the axis of the windings A and B respectively. It follows that under such conditions a ratio indicator may be made to give an increased range of movement of the indicating pointer, larger than would be obtained without this type of connection. When the current in winding B is zero, the current in winding A will cause the permanent magnet to coincide with the axis of the winding A, giving a deflection of the magnet and indicating needle to the position indicated in dotted lines extending to the upper limit of the scale. When the current in winding A is zero, then the current in winding B will cause the permanent magnet and indicating needle to assume a position indicated by the dotted lines extending to the lower end of the scale. Therefore the range of deflection of the indicating needle and the range of the scale will cover 120° with the particular relationship as shown in Fig. 1 compared with a much smaller range in the usual ratio meter. A greater range than that shown in Fig. 1 may be obtained by increasing the angular displacement between the windings A and B or a smaller range may be obtained by reducing this angular relationship. But the assumed displacement of the coils has been found practical with the type of ratio indicator shown in Fig. 1.

Fig. 1 shows a bridge connection of various parts wherein a potentiometer or variable impedance device P, having an adjustable contact 5 is incorporated. This contact is adjustable in response to change of any controlling factor such as a variable pressure or liquid level, variable optical, thermal, electric and magnetic quantities and so forth, and by this bridge arrangement the ratio instrument will indicate the value and change in values of any such variable factor according to the position of the variable contact. As the means for adjusting or for otherwise changing the relative values of P may be of various forms, no such means are disclosed in Fig. 1.

The source 6, indicated as a battery, supplies energy to the bridge, although any suitable direct current source may be used; and in some cases an alternating current source may be utilized. One lead from the source is connected to the adjustable contact 5 and the other lead connected at 7 to the bridge circuit. Impedance devices C and E are connected in series with each other from one terminal of P to the connection 7; and similar impedance devices D and F are connected in series with each other from the other terminal of P to the connection 7. The ratio instrument winding A is connected from a connection between P and C to a connection between D and F; and the instrument winding B is similarly connected from a connection between P and D to a connection between C and E. The impedance of C is equal to that of D; the impedance of E is equal to that of F; and the impedance of A is equal to that of B in the following considerations.

Assuming that the impedance values of the different parts of the circuit are of proper amounts and that the slider 5 is at the upper terminal of P, the current in winding B will have zero value and the current in winding A will have its maximum value. Then the permanent magnet 2 and its needle will take a position coinciding with the axis of the winding A and the needle will be over the upper limit of the scale. This condition exists when the following relationship of impedance is fulfilled.

*Equation 1*

$$\frac{C}{P} = \frac{E}{F + D + F\frac{(D+P)}{A}}$$

When the slider 5 is at the upper end of P and the current in B is zero, the potential difference at the terminals of B must be zero which requires that the voltage drop in C must equal the voltage drop in P. When the slider is adjusted from the upper end of P downwardly, the current in A will gradually decrease and the current in B will gradually increase, causing the needle of the instrument to move correspondingly. When the slider is at the mid-point of P, the current in the windings A and B will be equal in value and the needle will assume a mid-position on the scale plate. Continued movement of the slider will cause the current in A to decrease and that in B to increase; and when the slider is at the lower end of P the current in A will be zero and that in B will be a maximum. Then the instrument needle will assume a position coinciding with the direction of the axis of B and be over the lower limit of the scale. The drop in volts in P must then equal the drop in volts in D, giving zero potential difference at the terminals of winding A.

It is apparent that any change in the voltage of the source over broad ranges applied to the bridge circuit has no appreciable affect upon the indications of the instrument in its response to the position of the slider 5 or change of its position. Also the range of movement of the instrument indications and its scale attains an expansion over that obtained with the usual circuit connections of a ratio instrument.

In order to satisfy the foregoing Equation 1 and to properly match the impedance values with an efficient utilization of the energy in the bridge circuit, the following is an example of values of the impedances of the different parts of the circuit for obtaining the results described, or a very close approximation thereto.

|   | Ohms |
|---|---|
| P | 2 |
| A and B each | 4.73 |
| C and D each | .65 |
| E and F each | .43 |

In Fig. 2, the connections are the same as in Fig. 1 and corresponding parts are indicated by the same reference characters. But in Fig. 2 additional impedance devices G and H are added in the bridge circuit between P and C and between P and D respectively. These additional impedance devices serve as additional means to control the sensitivity of response of the ratio instrument. The impedance of the device G is made equal to the impedance of the device H; and when the impedance of C equals D, E equals F, and A equals B and with the slider at the upper end of P and with zero value of current in B, the following equation expresses the proper relationships:

*Equation 2*

$$\frac{C}{P} = \frac{E(A-C)}{G(4E+A+C)+E(A+C)+AC}$$

When the slider is moved downwardly the current in coil A will decrease and that in coil B will increase and when the slider is at its midposition the current in each coil of the instrument will be the same, giving a mid-point indication of the meter. As the slider continues to move downwardly, the current in winding A will continue to decrease and that in B will continue to increase and when the slider is at the lower end of P, the current in the coil A will attain a zero value and that in coil B will attain its maximum value, giving a full deflection of the meter to the lower end of the scale.

As an example of impedance values for obtaining these results, or a close approximation thereto, the following value will give proper matching relationship of the impedances:

|   | Ohms |
|---|---|
| P | 2 |
| G and H each | .5 |
| A and B each | 3.33 |
| C and D each | .31 |
| E and F each | .21 |

This relationship may be modified to some extent and still obtain satisfactory, practical results even though the current in windings A and B does not have zero value in the limiting positions of the slider.

In Fig. 3 a bridge circuit is utilized in which the resistances of the parts have much higher values than those previously considered and has the advantage of a greater utilization of energy in the network from the source 6. The adjustable impedance device P is shown shunted by a resistor 8 of greater resistance than that of P. Fig. 3 also shows the addition of means for compensating for changes of resistance in the windings A and B due to temperature changes, these windings being preferably of copper. In series with each of these windings a resistor 9 of carbon having a negative temperature coefficient is provided which in turn is in series with a resistor 10 of a material having approximately zero temperature coefficient, such as manganin or cupron. Each of the other resistors C, D, E, F and P are also of such material of approximately zero temperature coefficient within the range of temperature changes in the use of the apparatus. The circuit of Fig. 3 has been found to give a high degree of freedom from temperature errors by the use of available materials, the compensating of the A and B windings serving to minimize mismatching of the circuit relationships under temperature changes. The following values for obtaining proper balancing of the bridge circuit and for giving approximately zero current in A or B at the limits of adjustment of P have been found to give desirable results:

|   | Ohms |
|---|---|
| P | 100 |
| 8 | 500 |
| A and B each | 80 |
| C and D each | 32.5 |
| E and F each | 21.5 |
| 9 and 9 each | 100 |
| 10 and 10 each | 60 |

The shunting resistor 8 of Fig. 3 may be omitted in some cases and under such conditions the following values of resistances have served to obtain matching proportionality of the circuit with advantageous results:

|   | Ohms |
|---|---|
| P | 400 |
| A and B each | 320 |
| C and D each | 130 |
| E and F each | 86 |
| 9 and 9 each | 400 |
| 10 and 10 each | 240 |

In the foregoing examples, the carbon resistors 9 were assumed to have a negative temperature coefficient of .0033. By using carbon resistors 9 having a much higher negative temperature coefficient than that considered in the last examples, such as of .061, the resistance of the various devices may be considerably reduced and circuit matching approximately obtained by the following values with good results:

|   | Ohms |
|---|---|
| P | 100 |
| A and B each | 80 |
| C and D each | 32.5 |
| E and F each | 21.5 |
| 9 and 9 each | 23 |
| 10 and 10 each | 137 |

Instead of ballasting to minimize mismatching of the circuit under changes in temperature as above described by placing the negative coefficient resistor 9 in series with the resistor 10 of appromixately zero temperature coefficient and in series with the windings A and B respectively, the ballasting resistors 9 and 10 may be in parallel with each other and in series with the windings A and B respectively, as shown in Fig. 4.

Compensation for temperature changes may be accomplished by utilizing copper in the windings A and B, manganin or a low coefficient nickel alloy in the resistors E and F, manganin or cupron in P, copper in C and D, shunting P with a carbon resistor and shunting C and D with resistors of manganin. Fig. 5 shows such an arrangement with manganin resistors 11 shunting C and D respectively. The potentiometer P is shown shunted by a carbon resistor 12, the potentiometer being compensated at its location because of possible differences in temperature changes at its location and that of the other portions of the bridge circuit. If P be made of low temperature coefficient material, the shunt resistor 12 may be advantageously used. An advantage of the circuit of Fig. 5 is that the resistance of all of the cross connecting circuits of the A and B coils is included within the operating coils giving effective use therein of the energy of those circuits. Appropriate resistance values for approximate proportional matching of the bridge circuit of Fig. 5 may be as follows:

|   | Ohms |
|---|---|
| P | 100 |
| A and B each | 236 |
| C and D each | 32.5 |
| E and F each | 21.5 |

In all of the foregoing the values of resistances or impedances given are their approximate values at 25° centigrade. These relative values may be departed from somewhat and still obtain satisfactory practical results.

Fig. 6 shows a bridge circuit similar to Fig. 5 except the shunting resistor 12 is replaced by an adjustable resistor 13 of comparatively high resistance, and adjustable resistive trimmers X and Y are added in series with P. The shunting resistor 13 serves to proportion the voltage drops in C and D relatively to the overall resistance of P, X and Y; and the adjustable trimmers X and Y and adjustable resistance 13 are used to calibrate the variable control by P to a predetermined instrument sensitivity. By these resistors X, Y and 13 a sending unit comprising P, X and Y and 13 having variations in travel and travel placement of considerable extent may be compensated to a standard receiving ratio instrument of a predetermined sensitivity and calibration.

Fig. 7 is similar to Fig. 6 except that it shows a method of compensating the instrument and circuit network for temperature changes by means of resistors 14 connected in shunt to the resistors E and F respectively. The required negative coefficient may thus be obtained by making the resistors E and F of manganin and the shunting resistors 14 of carbon. Instead of shunting the resistors E and F, the carbon resistors may be connected in series with E and F respectively.

Fig. 8 is similar to Fig. 7 except the compensation is secured otherwise by forming the C and D resistors in sections C' and C'' and D' and D'' in series. The sections C' and D' may be made of manganin and the sections C'' and D'' of copper. An advantage of this method of compensating is that the resistance values of the sections may be made low and adjustments of their values may be made easily. A desirable practical example of the materials and resistance values of the circuit of Fig. 8 is as follows:

|  | Ohms |
|---|---|
| P of cupron | 82.4 |
| A and B of copper, each | 235.4 |
| C' and D' of manganin each | 20.5 |
| C'' and D'' of copper, each | 4.5 |
| E and F of manganin each | 21.4 |
| 13 of cupron | 2000 |
| X and Y of cupron, each | 13.45 |

When the converter for adjusting the contact 5 of the potentiometer is of the variable pressure type having spring pressure opposing the changes in applied pressures, such as a spring bellows, changes in temperature of the converter at its location may affect the readings of the instrument. This is due to the opposing spring stiffness increasing with decrease of temperature, causing corresponding decrease in readings of the instrument at lowered temperatures of the converter. This may be compensated by making the trimmer X, assumed to be at the pressure-on end of the potentiometer P, of copper. Any decrease of temperature will correspondingly decrease the resistance value of the copper trimmer X permitting a slightly increased current to be supplied to the A coil of the instrument and thereby compensate for the effects of the increase in stiffness of the spring. Thus in the foregoing example, instead of making the trimmer X of cupron and of 13.45 ohms, it may be made of copper of 8 ohms and cupron of 5.45 ohms for the particular instance considered.

Correction of zero shift of the instrument due to expansion coefficients of a converter bellows and spring may be compensated by a positive or negative coefficient resistor in the Y trimmer as conditions may require. However, a proper selection of materials for the bellows, spring and housing will minimize this error.

Fig. 9 shows apparatus and connections for utilizing the ratio instrument as a frequency meter. Parts corresponding to those previously described are indicated by the same reference characters. Instead of the bridge circuit being supplied by a direct current as indicated in prior figures, it is supplied by any suitable alternating source 15; and instead of using an adjustable impedance device P, a capacitor 16 is connected in series with an inductor 17 across the two sides of the bridge circuit at one end. One terminal of the source 15 is connected between 16 and 17 and the other terminal to the point 7. The movable element of the meter instead of being a permanent magnet as in the prior figures, is an elongated element 2a of soft iron. Any change in frequency of the source 15 will cause the currents supplied to the network branches to change relatively to each other and in the paths through the coils A and B of the instrument, and thereby indicate the frequency or any change of frequency of the source 15.

Fig. 10 is similar to Fig. 1 with corresponding parts similarly indicated. The apparatus is adapted for indicating temperatures or change of temperature at the control location. The potentiometer P is replaced by devices having appreciable temperature coefficients of resistance. At opposite sides of the connection of the source 6, there are connected in series in the bridge circuit suitable impedance devices, or resistors, having temperature coefficients of opposite sign. For example, the impedance device 18 on one side of the connection of the source may be a resistor of copper which has a positive temperature coefficient of resistance; and on the other side of the connection may be an impedance device or resistor 19 of carbon which has a negative temperature coefficient of resistance. By properly proportioning these impedances and calibrating the scale 4, the temperatures, or change thereof, at the source of control may be indicated at the meter; and the control location may be at a considerable distance from the indicating instrument. Any change of temperature at the control location will cause the impedances of 18 and 19 to change relatively and thereby change the relationship of the currents in the different branches of the network giving a corresponding change in the instrument indications. In some cases the carbon resistor 19 may be shunted by a resistor 20 of manganin or other material of approximately zero temperature coefficient for securing a balance of the coefficients of the opposite sides.

Fig. 11 shows a system wherein only one wire is used between the converter, or source of control, and the receiver, or instrument network. Here a source of alternating current is utilized, indicated by a transformer 21. One terminal of the secondary winding is connected between the impedance devices E and F. The other terminal is connected to a half wave rectifier or electric valve 22, from which the circuit continues to the intermediate connection of equal impedance devices 23 and 24 connected to opposite sides of the network at the control end. The valve 22 is shunted by a comparatively high resistor 25. A pulsating current will thus be passed through the network dividing in equal amounts through the network branches and thereby tend to maintain the indicating needle 3 at the mid-position of the scale.

A single wire 26 extends from one side of the network at the control end to one side of the potentiometer P at the converter location. The other side of the potentiometer is grounded at 27, giving a ground return to the control end of the network grounded at 28 opposite to the wire 26. Equal impedance devices 29 and 30 are connected across the potentiometer at the converter location; and from their junction a connection extends through a half wave rectifier, or electric valve 31, to the adjustable contact 5 of the potentiometer.

When the contact 5 is at the mid-position of the potentiometer, the converter circuits are balanced and the currents through the receiver are balanced causing the indicator of the ratio meter to be biased to its mid-position. When, however, the controlling influence moves the contact 5 from its mid-position, currents will be passed through the converter from the source, and the average value of these currents will be unbalanced causing more current to pass to one side of the receiver network than to the other side in its passage to the lower terminal of the secondary of the transformer 21. This unbalancing of the currents in the respective branches of the network will cause the meter pointer to be deflected from its mid-position to one side or the other according to the direction of movement of the contact 5 from its central position. And the greater the displacement of the contact 5, the greater will be the unbalancing of the currents in the receiver network and the greater will be the deflection of the instrument pointer from its mid-position. It follows that the instrument will at all times reflect the position of the contact 5 at the distant converter location.

With reference to each of the foregoing disclosures, this improvement is based fundamentally on a novel relationship of the bridge network as regards to elements and connections and relation to the variable controlling means. In each disclosure one of the meter windings is connected in series with an impedance device across the controlling means; and another of the meter windings is connected in series with another impedance device across the controlling means. Also the meter winding A of one such series connection and the impedance device C of the other such series connection are connected to one side of the controlling means, and the meter winding B of one such series connection and the impedance device D of the other such series connection are connected to the other side of the controlling means. Furthermore one side of the source is connected to the controlling means and the other side to the junction of the impedance devices E and F or to an intermediate point of an impedance device in which the devices E and F may be considered as combined in one unit, as indicated in Figs. 10 and 11. The remaining terminals of E and F are connected respectively to the intermediate connections of the series impedance devices and windings of the above described series connections.

It will be understood that the invention may be applied to various other purposes and that modifications may be made for adaptation to particular requirements. Likewise various values and relative values of the impedance devices and coil impedances may be used with advantageous results, even though the requirements of their proper proportional matching, or approximate proportional matching may not be obtained; but the closer the proportional matching is obtained, the more fully are the advantages of the invention attained. Although the various impedance or resistance devices have not been indicated in the drawings as adjustable, they may be made such for obtaining their desired values and when so obtained, they may be made as adjustable or non-adjustable units of the ranges or values previously determined. The impedance devices may be capacitive, resistive, or inductive, or a combination of two or all three, according to their selection for particular purposes.

I claim:

1. A bridge network comprising controlling means connected to one portion of the network for varying the energy supplied to the respective branches of the network, a source of energy having one terminal thereof connected to said controlling means, a ratio meter having windings, an impedance device connected in series with one of the windings of the said meter, said series combination being connected across said controlling means, a second impedance device connected in series with another of the windings of said meter, said second series combination being connected across said controlling means, the said series combinations having the impedance device of said first named series combination and the winding of the second named series combination connected to one side of said controlling means and having the winding of said first named series combination and the impedance device of the said second named series combination connected to the other side of said controlling means, and a third impedance device connected between the intermediate connections respectively of the impedance devices and windings of said first and second series combinations, the other terminal of said source being connected between portions of said third impedance device.

2. A bridge network comprising controlling means connected to one portion of the network for varying the energy supplied to the respective branches of the network, a source of energy having one terminal thereof connected to said controlling means, a ratio meter having windings, an impedance device connected in series with one of the windings of the said meter, said impedance device and winding being connected across said controlling means, a second impedance device connected in series with another of the windings of said meter, said second impedance device and other winding being connected across said controlling means, the said series combinations having the impedance device of said first named series combination and the winding of the second named series combination connected to one side of said controlling means and having the winding of said first named series combination and the impedance device of the said second named series combination connected to the other side of said controlling means, and a third impedance device connected between the intermediate connections respectively of the impedance devices and windings of said first and second series combinations, the other terminal of said source being connected between portions of said third impedance device, said impedance devices being relatively proportioned for obtaining approximately zero current in said windings respectively when the controlling means is at its respective limits of control.

3. A bridge network comprising controlling means connected to one portion of the network for varying the energy supplied to the respective branches of the network, a source of energy having one terminal thereof connected to said controlling means, a ratio meter having windings, an impedance device connected in series with one of the windings of the said meter, said impedance device and winding being connected across said controlling means, a second impedance device connected in series with another of the windings of said meter, said second impedance device and other winding being connected across said controlling means, the said series combinations having the impedance device of said first named series combination and the winding of the second named series combination connected to one side of said controlling means and having the winding of said first named series combination and the impedance device of the said second named series combination connected to the other side of said controlling means, a third impedance device connected between the intermediate connections respectively of the impedance devices and windings of said first and second series combinations, the other terminal of said source being connected between portions of said third impedance device, and an impedance device connected respectively in each side of the bridge circuit between the controlling means and the said cross connections thereto.

4. A bridge network comprising controlling means connected to one portion of the network for varying the energy supplied to the respective branches of the network, a source of energy having one terminal thereof connected to said controlling means, a ratio meter having windings, an impedance device connected in series with one of the windings of the said meter, said impedance device and winding being connected across said controlling means, a second impedance device connected in series with another of the windings of said meter, said second impedance device and other winding being connected across said controlling means, the said series combinations having the impedance device of said first named series combination and the winding of the second named series combination connected to one side of said controlling means and having the winding of said first named series combination and the impedance device of the said second named series combination connected to the other side of said controlling means, a third impedance device connected between the intermediate connections respectively of the impedance devices and windings of said first and second series combinations, the other terminal of said source being connected between portions of said third impedance device, and means connected in circuit with said windings for reducing the effects of temperature changes of said windings.

5. A bridge network comprising controlling means connected to one portion of the network for varying the energy supplied to the respective branches of the network, a source of energy having one terminal thereof connected to said controlling means, a ratio meter having windings, an impedance device connected in series with one of the windings of the said meter, said impedance device and winding being connected across said controlling means, a second impedance device connected in series with another of the windings of said meter, said second impedance device and other winding being connected across said controlling means, the said series combinations having the impedance device of said first named series combination and the winding of the second named series combination connected to one side of said controlling means and having the winding of said first named series combination and the impedance device of the said second named series combination connected to the other side of said controlling means, a third impedance device connected between the intermediate connections respectively of the impedance devices and windings of said first and second series combinations, the other terminal of said source being connected between portions of said third impedance device, and means connected in circuit with said windings for reducing the effects of temperature changes of said windings, certain of said impedance devices being of materials having low temperature coefficients of resistance.

6. A bridge network comprising controlling means connected to one portion of the network for varying the energy supplied to the respective branches of the network, a source of energy having one terminal thereof connected to said controlling means, a ratio meter having windings, an impedance device connected in series with one of the windings of the said meter, said impedance device and winding being connected across said controlling means, a second impedance device connected in series with another of the windings of said meter, said second impedance device and other winding being connected across said controlling means, the said series combinations having the impedance device of said first named series combination and the winding of the second named series combination connected to one side of said controlling means and having the winding of said first named series combination and the impedance device of the said second named series combination connected to the other side of said controlling means, a third impedance device connected between the intermediate connections respectively of the impedance devices and windings of said first and second series combinations, the other terminal of said source being connected between portions of said third impedance device, and means of material having different temperature coefficient of resistance from said first and second named impedance devices connected respectively to said first and second named impedance.

7. A bridge network comprising controlling means connected to one portion of the network for varying the energy supplied to the respective branches of the network, a source of energy having one terminal thereof connected to said controlling means, a ratio meter having windings, an impedance device connected in series with one of the windings of the said meter, said impedance device and winding being connected across said controlling means, a second impedance device connected in series with another of the windings of said meter, said second impedance device and other winding being connected across said controlling means, the said series combinations having the impedance device of said first named series combination and the winding of the second named series combination connected to one side of said controlling means and having the winding of said first named series combination and the impedance device of the said second named series combination connected to the other side of said controlling means, a third impedance device connected between the intermediate connections respectively of the impedance devices and windings of said first and second series combinations, the other terminal of said source being connected between portions of said third impedance device, and means of material having different temperature coefficient of resistance from said third impedance device connected to said third impedance device.

8. A bridge network comprising controlling means connected to one portion of the network for varying the energy supplied to the respective branches of the network, a source of energy having one terminal thereof connected to said controlling means, a ratio meter having windings, an impedance device connected in series with one of the windings of the said meter, said impedance device and winding being connected across said controlling means, a second impedance device connected in series with another of the windings of said meter, said second impedance device and other winding being connected across said controlling means, the said series combinations having the impedance device of said first named series combination and the winding of the second named series combination connected to one side of said controlling means and having the winding of said first named series combination and the impedance device of the said second named series combination connected to the other side of said controlling means, a third impedance device connected between the intermediate connections respectively of the impedance devices and windings of said first and second series combinations, the other terminal of said source being connected between portions of said third impedance device, and a high resistance device connected in shunt across said controlling means.

9. A bridge network comprising controlling means connected to one portion of the network for varying the energy supplied to the respective branches of the network, a source of energy having one terminal thereof connected to said controlling means, a ratio meter having windings, an impedance device connected in series with one of the windings of the said meter, said impedance device and winding being connected across said controlling means, a second impedance device connected in series with another of the windings of said meter, said second impedance device and other winding being connected across said controlling means, the said series combinations having the impedance device of said first named series combination and the winding of the second named series combination connected to one side of said controlling means and having the winding of said first named series combination and the impedance device of the said second named series combination connected to the other side of said controlling means, a third impedance device connected between the intermediate connections respectively of the impedance devices and windings of said first and second series combinations, the other terminal of said source being connected between portions of said third impedance device, and a high resistance device connected in shunt across said controlling means, the material of said resistance device having a different temperature coefficient of resistance from that of said controlling means.

10. A bridge network comprising controlling means connected to one portion of the network for varying the energy supplied to the respective branches of the network, a source of energy having one terminal thereof connected to said controlling means, a ratio meter having windings, an impedance device connected in series with one of the windings of the said meter, said impedance device and winding being connected across said controlling means, a second impedance device connected in series with another of the windings of said meter, said second impedance device and other winding being connected across said controlling means, the said series combinations having the impedance device of said first named series combination and the winding of the second named series combination connected to one side of said controlling means and having the winding of said first named series combination and the impedance device of the said second named series combination connected to the other side of said controlling means, a third impedance device connected between the intermediate connections respectively of the impedance devices and windings of said first and second series combinations, the other terminal of said source being connected between portions of said third impedance device, a high resistance device connected in shunt across said controlling means, and additional trimmer resistance devices connected respectively between the terminals of said controlling means and said high resistance device.

11. A bridge network comprising controlling means connected to one portion of the network for varying the energy supplied to the respective branches of the network, a source of energy having one terminal thereof connected to said controlling means, a ratio meter having windings, an impedance device connected in series with one of the windings of the said meter, said impedance device and winding being connected across said controlling means, a second impedance device connected in series with another of the windings of said meter, said second impedance device and other winding being connected across said controlling means, the said series combinations having the impedance device of said first named series combination and the winding of the second named series combination connected to one side of said controlling means and having the winding of said first named series combination and the impedance device of the said second named series combination connected to the other side of said controlling means, and a third impedance device connected between the intermediate connections respectively of the impedance devices and windings of said first and second series combinations, the other terminal of said source being connected between portions of said third impedance device, said controlling means comprising devices differently responsive to change of frequency of said source for affecting the current distribution in different branches of the network.

12. A bridge network comprising controlling means connected to one portion of the network for varying the energy supplied to the respective branches of the network, a source of energy having one terminal thereof connected to said controlling means, a ratio meter having windings, an impedance device connected in series with one of the windings of the said meter, said impedance device and winding being connected across said controlling means, a second impedance device connected in series with another of the windings of said meter, said second impedance device and other winding being connected across said controlling means, the said series combinations having the impedance device of said first named series combination and the winding of the second named series combination connected to one side of said controlling means and having the winding of said first named series combination and the impedance device of the said second named series combination connected to the other side of said controlling means, and a third impedance device connected between the intermediate connections respectively of the impedance devices and windings of said first and second series combinations, the other terminal of said source being connected between portions of said third impedance device, said controlling means comprising devices differently responsive to change of temperature for affecting the current distribution in different branches of the network.

13. A bridge network comprising means connected thereto for controlling energy supplied to the respective branches of the network, a source of energy having one terminal thereof connected to said controlling means, a ratio meter including a pair of windings connected to said controlling means, an impedance element in series with one of said windings, said series combination being connected to said controlling means, a second impedance element in series with the other of said windings, said second series combination to be connected to said controlling means, said first and second series combinations being connected in parallel with each other and the parallel combination being bridges across said controlling means, and a third impedance element connected between the intermediate connections respectively of the impedance elements and windings of said first and second series combinations, the other terminal of said source being connected to said third impedance element.

14. A bridge network comprising variable means for controlling energy supplied to the respective branches of the network, a source of energy having one terminal thereof connected to said variable means, a ratio meter including a pair of windings connected to said variable means, a first impedance means connected serially with one of said windings, a second impedance means connected serially with the other of said windings, said first and second series combinations being connected in parallel relationship with each other and being bridged across said variable means, and third impedance means connected respectively to the junctions between said first impedance means and associated winding and said second impedance means and associated winding, the other terminal of said source being connected to said third impedance means.

15. A bridge network comprising variable means for controlling energy supplied to the respective branches of the network, a source of energy having one terminal thereof connected to said variable means, a ratio meter including a pair of windings connected to said variable means, an armature responsive to said windings, said windings being so disposed as to cause said armature to travel over a range greater than 90°, an impedance element serially connected with one of said windings, a second impedance element serially connected with the other of said windings, said first and second series combination being connected in parallel relationship with each other and the parallel combination being bridged across said variable means, and a third impedance element connected between the intermediate connections respectively of the impedance elements and windings of said first and second series combination, the other terminal of said source being connected to said third impedance element.

16. A bridge network comprising means connected to one portion of the network for controlling energy supplied to the respective branches of the network, a member in said means responsive to a controlling influence, a source of energy having one terminal thereof connected to said member, a ratio meter including a pair of windings connected to said controlling means, an impedance element in series with one of said windings, said series combination being connected to said controlling means, a second impedance element in series with the other of said windings, said second series combination being connected to said controlling means, said first and second series combinations being connected in parallel with each other and the parallel combination being bridged across said controlling means, and a third impedance element connected between the intermediate connections respectively of the impedance element and windings of said first and second series combination, the other terminal of said source being connected to said third impedance element.

17. A bridge network comprising means connected to one portion of the network for controlling the energy supplied to the respective branches of the network, a source of energy having one terminal thereof connected to said controlling means, a ratio meter including a pair of windings connected to said controlling means, an impedance element in series with one of said windings, said series combination being connected to said controlling means, a second impedance element in series with the other of said windings, said second series combination being connected in parallel with each other and the parallel combination being bridged across said controlling means, and a third impedance element connected between the intermediate connections respectively of the impedance elements and windings of said first and second series combinations, the other terminal of said source being connected to said third impedance element, said impedance elements being relatively proportioned for obtaining reversal of current of said windings respectively when the controlling means is at its respective limits of control.

18. A bridge network comprising means connected to one portion of the network for controlling the energy supplied to the respective branches of the network, a source of energy having one terminal thereof connected to said controlling means, a ratio meter including a pair of windings connected to said controlling means, an impedance element in series with one of said windings, said series combination being connected to said controlling means, a second impedance element in series with the other of said windings, said second series combination being connected in parallel with each other and the parallel combination being bridged across said controlling means, and a third impedance element connected between the intermediate connections respectively of the impedance elements and windings of said first and second series combinations, the other terminal of said source being connected to said third impedance element, said impedance elements being relatively proportioned for obtaining decrease of current in said windings respectively when the controlling means approaches its respective limits of control.

CLARE ANDERSON.